(No Model.)
J. KIDDER.
PULLEY.
No. 441,170. Patented Nov. 25, 1890.
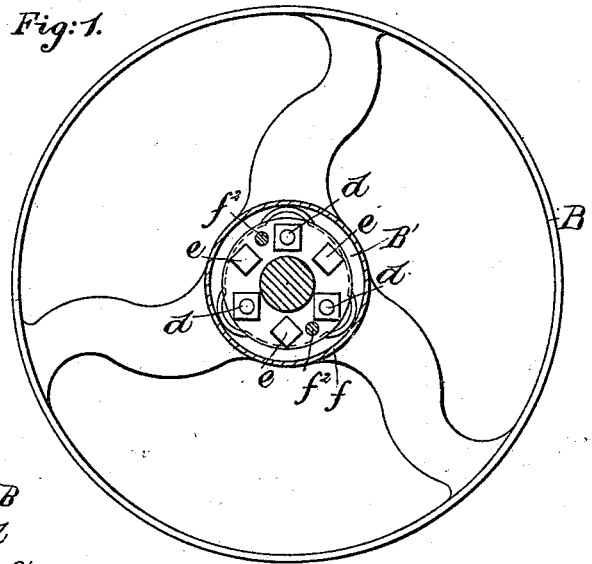
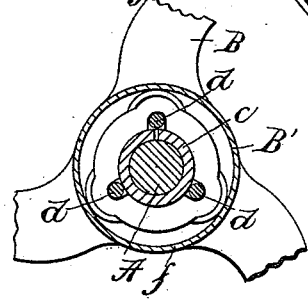
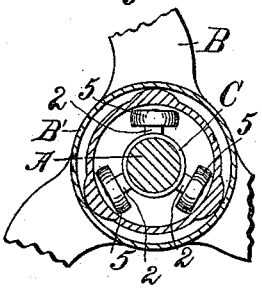
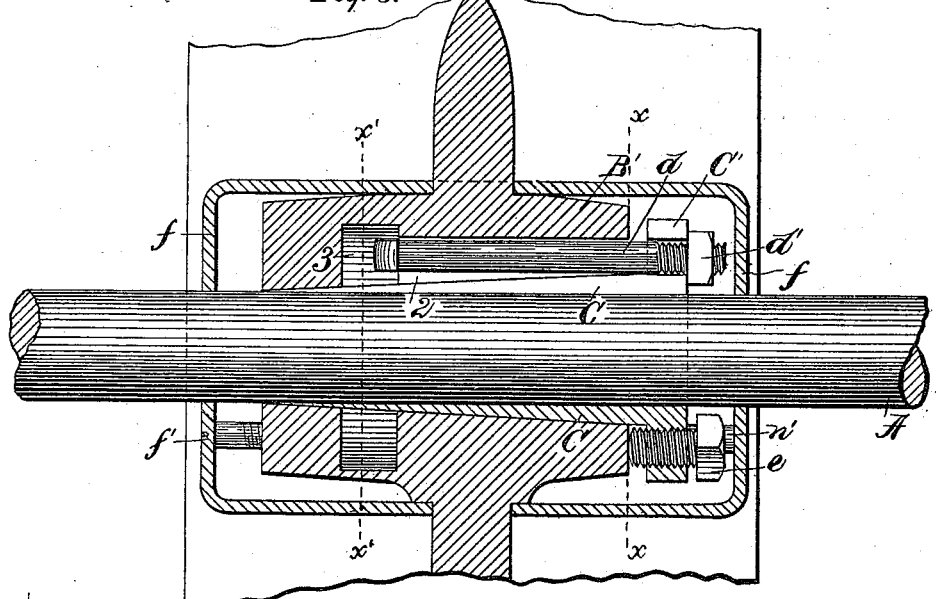
Witnesses
Inventor
Jason Kidder

UNITED STATES PATENT OFFICE.

JASON KIDDER, OF FRANKLIN FALLS, NEW HAMPSHIRE.

PULLEY.

SPECIFICATION forming part of Letters Patent No. 441,170, dated November 25, 1890.

Application filed September 11, 1890. Serial No. 364,662. (No model.)

*To all whom it may concern:*

Be it known that I, JASON KIDDER, of Franklin Falls, county of Merrimack, State of New Hampshire, have invented an Improvement in Pulleys, of which the following description, in connection with the accompanying drawings, is a specification, like letters and figures on the drawings representing like parts.

In mills and other places wherein belts are extended over drive-pulleys to rotate shafting it is customary to confine the pulley to the shaft by a set-screw extended through the hub of the pulley and screwed against the shaft. In use the projecting heads of the set-screws frequently catch parts of the clothing and cause accidents and sometimes loss of life. A set-screw of the kind referred to cannot be depended upon to hold the pulley at the desired point on the shaft without the shaft is prepared for the contact of the inner end of the screw against it, and to adjust the pulley longitudinally involves trouble. To overcome these difficulties, I have devised means whereby the pulley may be clamped to the shaft, the means being a split sleeve conical externally to fit the conical interior of the hub of the pulley, the said sleeve being made movable longitudinally within the said hub and between it and the shaft by means of draw-bolts placed in longitudinal grooves of the hub and contacting at one end with the hub, while a nut on each draw-bolt acts against the end of the sleeve, the hub, or the end thereof, the pulley where the ends of the bolts are exposed being covered by a cap, thus leaving a smooth hub without any injurious projections.

Figure 1 in side elevation represents a belt-pulley embodying my invention; Figs. 2 and 3, different cross-sections of the hub. Fig. 4 shows the split sleeve detached; Fig. 5, an enlarged longitudinal section of the hub, the dotted lines $x$ and $x'$ representing the points of section for Figs. 2 and 3; and Fig. 6 shows the head of one of the draw-bolts.

Referring to the drawings, A represents part of the shaft to be driven, and B the pulley to be connected to it. The hub B' of this pulley is made conical internally, as best shown in Fig. 5, and the inner wall of the hub is grooved longitudinally at three places, as shown, and these longitudinal grooves 2 are intersected by an annular groove 3.

Between the shaft A and the interior of the hub I have interposed a sleeve C, which fits the shaft; but said sleeve split at one side from end to end, as shown at 4, (see Fig. 4,) is made conical externally to fit the conical interior of the hub B', and has a flange C' at one end, which flange is suitably notched to receive the outer ends of the draw-bolts $d$, having their heads 5, preferably of T shape, placed in the annular groove 3, nuts $d'$ being screwed upon the outer ends of the said draw-bolts, rotation of the said nuts by a wrench to turn them onto the said bolts enabling the nuts to force the conical split sleeve tightly into the space between the hub and shaft, thus compressing the sleeve, causing it to firmly clasp the shaft, so that the pulley rotates with the shaft. By slackening the nuts and turning in the starting-screws $e$ the sleeve may be pulled out from the hub to release the shaft.

To thoroughly protect the outer ends of the bolts and prevent the nuts $d'$ from affording a projection against which clothing may catch, I have provided the hub ends with a cap $f$, which may be held in place by screws $f'$, screwed into holes, as $f^2$. (See Fig. 1, where the cap is shown in section.) This cap forms a smooth-finished end and hub for the pulley.

I claim—

1. The herein-described adjustable pulley, it having a hub conical internally and having longitudinal grooves and an intersecting annular groove therein, and a flanged sleeve split longitudinally and having a conical external and cylindrical internal surface, combined with headed draw-bolts placed in the longitudinal grooves and extending through the flange of the sleeve, retaining-nuts thereon, and starting-screws between said flange and hub, to operate substantially as described.

2. The herein-described pulley, it having a hub conical internally and grooved longitudinally, and a flanged sleeve split longitudinally and made conical externally to enter the hub and cylindrical internally to fit a shaft, combined with the draw-bolts and their nuts, and with a cap at the end of the hub to inclose and cover the said nuts and bolts, said cap being attached to the hub therewith, substantially as described.

In testimony whereof I have signed my name to this specification in the presence of two subscribing witnesses.

JASON KIDDER.

Witnesses:
RUFUS G. BURLEIGH,
HALLER K. SMITH.